United States Patent [19]
Miura et al.

[11] Patent Number: 6,102,685
[45] Date of Patent: Aug. 15, 2000

[54] MOLD-CLAMPING DEVICE OF BLOW MOLDING MACHINE

[75] Inventors: Eiki Miura; Masayuki Oosaki, both of Tochigi, Japan

[73] Assignee: Kao Corporation, Tokyo, Japan

[21] Appl. No.: 09/147,190

[22] PCT Filed: Feb. 25, 1997

[86] PCT No.: PCT/JP97/00536

§ 371 Date: Oct. 26, 1998

§ 102(e) Date: Oct. 26, 1998

[87] PCT Pub. No.: WO98/38025

PCT Pub. Date: Sep. 3, 1998

[51] Int. Cl.[7] .................................................. B29C 49/56
[52] U.S. Cl. ...................... 425/193; 425/451.5; 425/541
[58] Field of Search ............................. 425/541, 451.5, 425/451.6, 182, 193

[56] References Cited

U.S. PATENT DOCUMENTS

| | | | |
|---|---|---|---|
| 3,277,534 | 10/1966 | McDonald et al. | 425/541 |
| 3,344,471 | 10/1967 | Martelli | 425/182 |
| 3,860,375 | 1/1975 | Kinslow, Jr. et al. | 425/182 |
| 3,964,852 | 6/1976 | Marfiewicz | 425/541 |
| 4,281,977 | 8/1981 | Farrell | 425/451.6 |
| 5,069,613 | 12/1991 | Inaba et al. | 425/451.5 |
| 5,123,834 | 6/1992 | Joyner | 425/451.6 |
| 5,478,229 | 12/1995 | Kato et al. | 425/541 |

FOREIGN PATENT DOCUMENTS

| | | | |
|---|---|---|---|
| 46-42035 | 11/1971 | Japan | 425/451.6 |
| 51-149373 | 12/1976 | Japan . | |
| 4-039018 | 2/1992 | Japan . | |
| 7-032366 | 2/1995 | Japan . | |
| 8-281783 | 10/1996 | Japan . | |

*Primary Examiner*—Robert Davis
*Attorney, Agent, or Firm*—Oblon, Spivak, McClelland, Maier & Neustadt, P.C.

[57] ABSTRACT

A mold-clamping device for a blow molding machine. The device includes a body and tie bars which move forwardly and backwardly while supported in a horizontal posture by the body. It also includes front and rear platens which are disposed on the front and rear end portions of the tie bars. A movable platen which is forwardly and backwardly movable is also disposed on the tie bars in such a manner as to face the front platen. Split mold halves are disposed on opposite sides of the front platen and the movable platen. The body portion is provided with a crank mechanism and a driving source so that the driving force transmits a driving force to a crank shaft of the crank mechanism. The rear platen and the movable platen are connected to a crank arm of the crank mechanism through connecting rods.

4 Claims, 6 Drawing Sheets

MOLD-CLAMPING DEVICE OF BLOW MOLDING MACHINE

BACKGROUND OF THE INVENTION

1. Field of the Invention

This invention relates to a mold-clamping device of a blow molding machine usable when a hollow-molded product is manufactured by a blow molding process.

2. Discussion of the Background

A mold-clamping device 1' as shown in FIG. 8 is known as a conventional technique relating to a mold-clamping device of a blow molding machine to be used when a molded product is produced by a blow molding process. This mold-clamping device 1' includes a body portion 2', tie bars 3', 3' forwardly and backwardly movably supported in their horizontal postures by the body portion 2', a front platen 4' and a rear platen 5' provided on a front end portion and a rear end portion of the tie bars 3', 3', respectively, a movable platen 6' forwardly and backwardly movably disposed on the tie bars 3', 3' in such a manner as to face with the front platen 4', split mold halves 7', 8' disposed on the mutually opposing sides of the front platen 4' and the movable platen 6', and a pinion-rack mechanism 10' for guiding the movement of the rear platen 5' and the movable platen 6'.

The mold-clamping device 1' is installed such that a parison P hanging down from a cross head C of an extruding device S can be guided into a cavity of the split mold halves 7', 8'. Then, the molding is started. First, a solenoid valve 12' and one pair of servo valves 13' are controlled by a hydraulic unit 11' such that a piston rod 90' of the piston-cylinder mechanism 9' is pushed to move the movable platen 6' towards the parison P and to move the rear platen 5' in an opposite direction to the parison P. Then, the front platen 4' is caused to move towards the parison P by the backward movement of the tie bar 3' in response to the movement of the rear platen 5', so that the parison P is held between the split mold halves 7', 8'. After the finish of the blow molding, the piston rod 90' is contracted to cause the rear platen 5' and the movable platen 6' to escape from the molded product, thereby completing the molding operation.

By the way, in the above mold-clamping device 1', it is normally required to operate the hydraulic unit 11' in order to stabilize the hydraulic even when opening-and-closing operation of the split mold halves are not undergoing, and in addition, the thrust force of the cylinder-piston mechanism 9' must be maintained in its generated state in order to cope with the elevation of the pressure within the split mold halves 7', 8'. Therefore, the running cost is inevitably increased. Moreover, there are involved various problems liable to occur to hydraulic devices, such as fluctuation of operating time due to leakage of oil and change in oil temperature, dirty losses and noises during molding, indispensable space increase, etc.

Furthermore, since the tie bars 3', 3' are arranged only on the underneath with respect to the split mold halves 7', 8', it is difficult that the clamping force is uniformly applied to the abutment surfaces of the split mold halves 7', 8'. Although the front and rear platens 4', 5' are provided with clamping force adjusting bolts 14', 15' for adjusting the clamping force, it is nevertheless difficult to obtain a uniform clamping force. Therefore, the larger clamping force than necessary at the abutment surfaces of the split mold halves 7', 8' is applied to the front and rear platens 4', 5'. As a consequence, the front and rear platens 4', 5', and the movable platen 6' are unduly required to be increased in physical strength to that extent. This eventually results in a large size of the device as a whole.

SUMMARY OF THE INVENTION

It is, therefore, an object of the present invention to provide a mold-clamping device of a blow molding machine capable of solving the above-mentioned problems.

The present invention has achieved the above object by providing in a mold-clamping device of a blow molding machine a body portion, tie bars for movement forwardly and backwardly supported in a horizontal posture thereof by the body portion, a front and a rear platen disposed respectively on a front and a rear end portion of the tie bars, a movable platen forwardly and backwardly movably disposed on the tie bars in such a manner as to face with the front platen, and split mold halves disposed on the mutually opposing sides of the front platen and the movable platen, the mold-clamping device in a blow molding machine being characterized in that the body portion is provided with a crank mechanism and a driving source, the driving source is for transmitting a driving force to the crank mechanism and a crank shaft of the crank mechanism, and the rear platen and the movable platen are connected to a crank arm of the crank mechanism respectively through connecting rods.

The present invention provides a mold-clamping device of a blow molding machine characterized by further including, a fixed position adjusting mechanism capable of fixing the front platen to the tie bars at a desired position of a front end portion of the tie bars.

The present invention provides a mold-clamping device of a blow molding machine characterized by further including a mechanism capable of adjusting an expanding and contracting length of the crank mechanism.

The present invention provides a mold-clamping device of a blow molding machine characterized in that, the front platen and the movable platen are arranged on the tie bars such that they are in symmetrical relation with respect to the center of the split mold halves.

In the mold-clamping device of a blow molding machine when a driving force is transmitted to the crank shaft of the crank mechanism by the driving source, the front platen and the movable platen are mutually approached to cause the split mold halves to come into abutment and the crank arm is linearly stretched from its bent state. For this reason, the driving source does not require any torque even when a clamping force is generated. Furthermore, since the crank mechanism is employed for opening and closing the split mold halves, the various problems attributable to the use of the conventional hydraulic devices do not occur.

In the mold-clamping device of a blow molding machine there is a provision of the fixed position adjusting mechanism capable of fixing the front platen to the tie bar at a desired position of a front end portion of the tie bar and therefore, the position of the front platen can be adjusted in match with the size and the configuration of the split mold halves. Accordingly, the clamping force can be generated normally in the state where the crank arm of the crank mechanism and the connecting rods are linearly stretched.

In the mold-clamping device of a blow molding machine since there is a provision of the mechanism capable of adjusting the expanding and contracting length of the crank mechanism, the expanding and contracting length of the crank mechanism can also be adjusted in match with the size and the configuration of the split mold halves. This makes it possible to generate the clamping force normally in the state where the crank arm of the crank mechanism and the connecting rods are linearly stretched.

In the mold-clamping device of a blow molding machine since the front platen and the movable platen are arranged on the tie bar such that they are in symmetrical relation with respect to the center of the split mold halves, a clamping force can be applied uniformly to the abutment surfaces of the split mold halves. Accordingly, the front platen and the movable platen, on which the split mold halves are arranged, can be reduced in size and weight, and the device can be reduced in size and weight as a whole.

BRIEF DESCRIPTION OF DRAWINGS

FIG. 4 is a view showing the fixed position adjusting mechanism,

FIG. 6 is a view showing the expanding-and-contracting length adjusting mechanism.

DETAILED DESCRIPTION OF THE PREFERRED EMBODIMENTS

Figure 1:
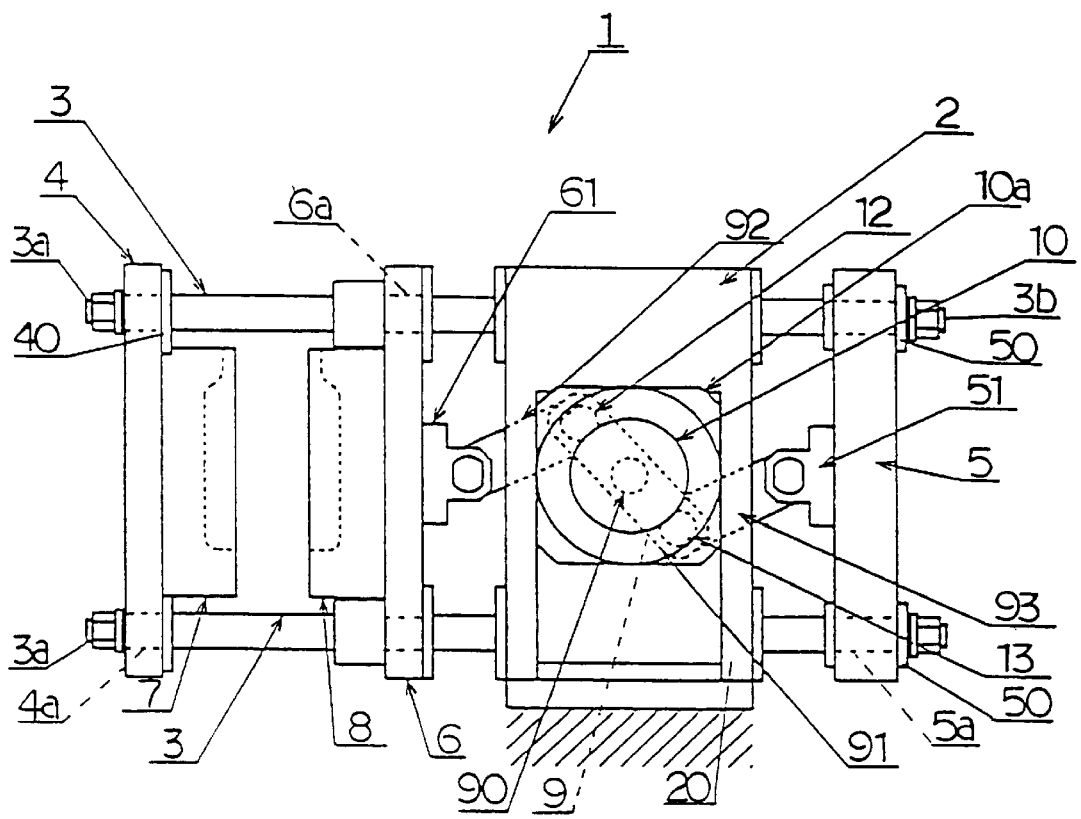
FIG. 1 is a schematic side view showing one embodiment of a mold-clamping device of a blow molding machine according to the present invention.

One embodiment of the present invention will be described hereinafter with reference to the accompanying drawings.

FIGS. 1 through 6 show one embodiment of a mold-clamping device of a blow molding machine according to the present invention. In these Figures, reference numeral 1 denotes a mold-clamping device of a blow molding machine (hereinafter simply referred to as the "mold-clamping device").

Figure 2:
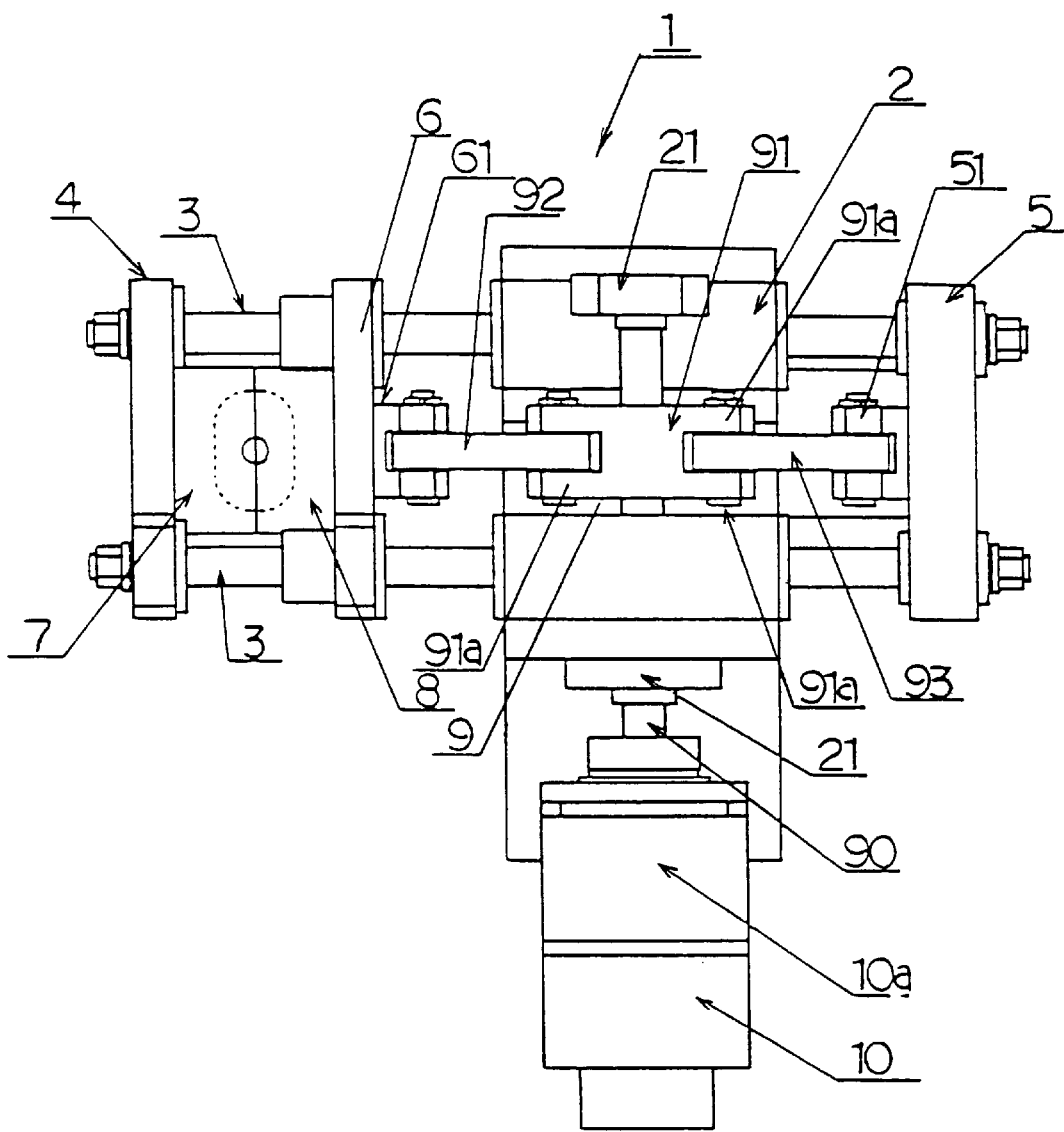
FIG. 2 is a schematic plan view of the mold-clamping device of the above embodiment.

As shown in FIGS. 1 and 2, the mold-clamping device 1 includes a device body 2, tie bars 3,3 horizontally supported on the device body 2 for movement forwardly and backwardly, a front platen 4 provided on front portions of the tie bars 3,3, a rear platen 5 provided on rear portions of the tie bars 3,3 and a movable platen 6 provided on the tie bars 3,3 in an opposing relation with the front platen 5 and for movement forwardly and backwardly. The mold-clamping device 1 further includes split molds 7, 8 on the opposing sides of the front platen 4 and the movable platen 6.

Annexed to the device body 2 are a crank mechanism 9, and an electric motor (a driving force) 10 for transmitting a driving force to a crank shaft 90 of this crank mechanism 9. The movable platen 6 and the rear platen 5 are connected to a crank arm 91 of the crank mechanism 9 through a connecting rods 92, 93, respectively.

The mold-clamping device 1 is described in greater detail. The body portion 2 comprises a frame member 20 as a main component member, and the tie bars 3, 3 are forwardly and backwardly movably supported in their horizontal postures by the diagonal corner portions of the frame member 20.

Male screw portions 3a, 3b are provided on front and rear end portions of the tie bars 3, respectively. Bushes 40, 50 of front and rear platens 4, 5 as later described are threadingly engaged with the male screw portions 3a, 3b, respectively.

The front platen 4, the rear platen 5, and the movable platen 6 are each formed of a regular square plate-like member in a front view. Insertion cavities 4a, 5a, 6a for inserting the tie bars 3 therein are provided at diagonal corner portions of the platens. The front platen 4 and the movable platen 6 can be arranged on the tie bars 3,3 so that the tie bars 3,3 are symmetrically located with respect to the centers of the split molds 7, 8.

Bushes 40 and 50 having female screw portions (not shown) corresponding to the male screw portions 3a, 3b of the tie bars 3 are provided at the insertion cavities 4a, 5a of the front and rear platens 4, 5. Owing to this arrangement, each platen can be fixed to prescribed positions of the front and rear end portions of the tie bars 3. A pulley 30 (see FIG. 3) is fixed to a front surface portion of the bush 40 of the front platen 4. Support jigs 51, 61 for supporting one end portions of the connecting rods 92, 93 at the same height as the axis of the crank shaft 90 through the pins are fixed to surface portions of the rear platen 5 and the movable platen 6 opposing the device body 2.

Figure 3:
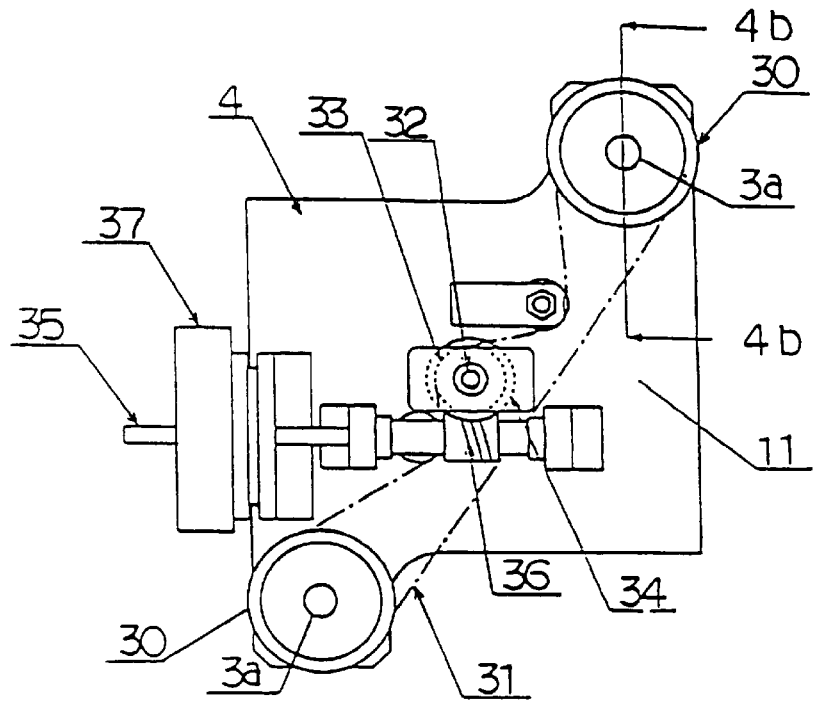
FIG. 3 is a front view showing a fixed position adjusting mechanism of a front platen in the mold-clamping device of the above embodiment.
Figures 4A, 4B:
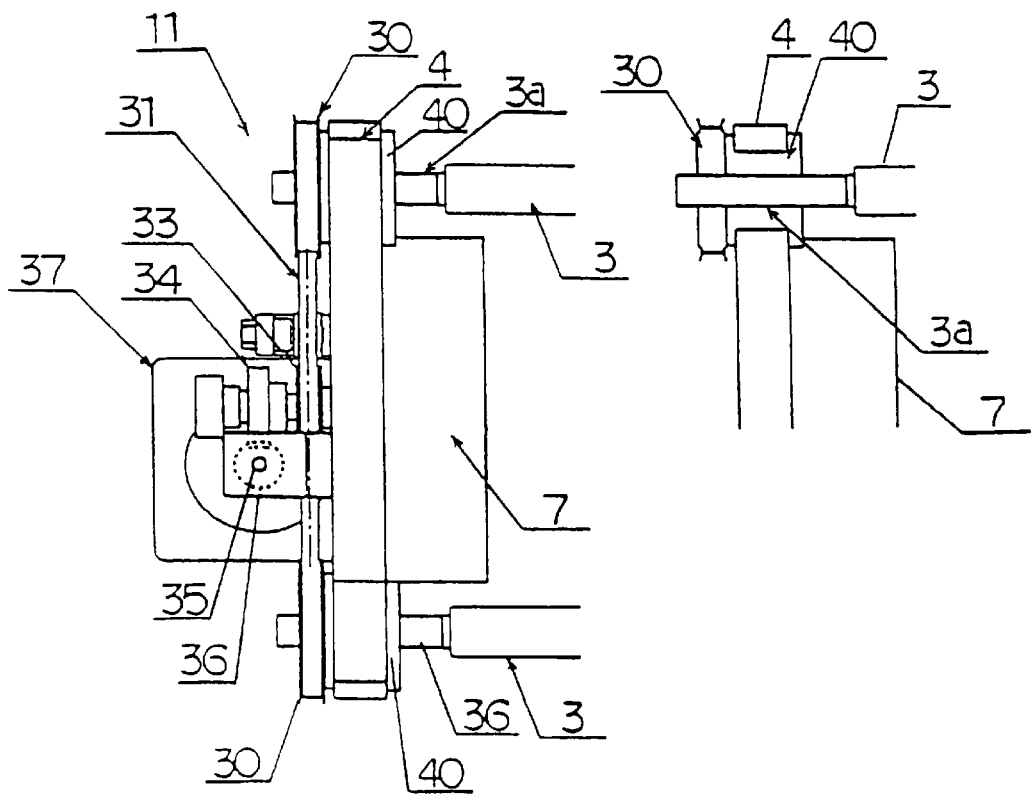
FIG. 4(a) is a side view thereof.
FIG. 4(b) is a sectional view taken on line A—A and viewed in a direction as indicated by arrows of FIG. 3.
Figure 5:
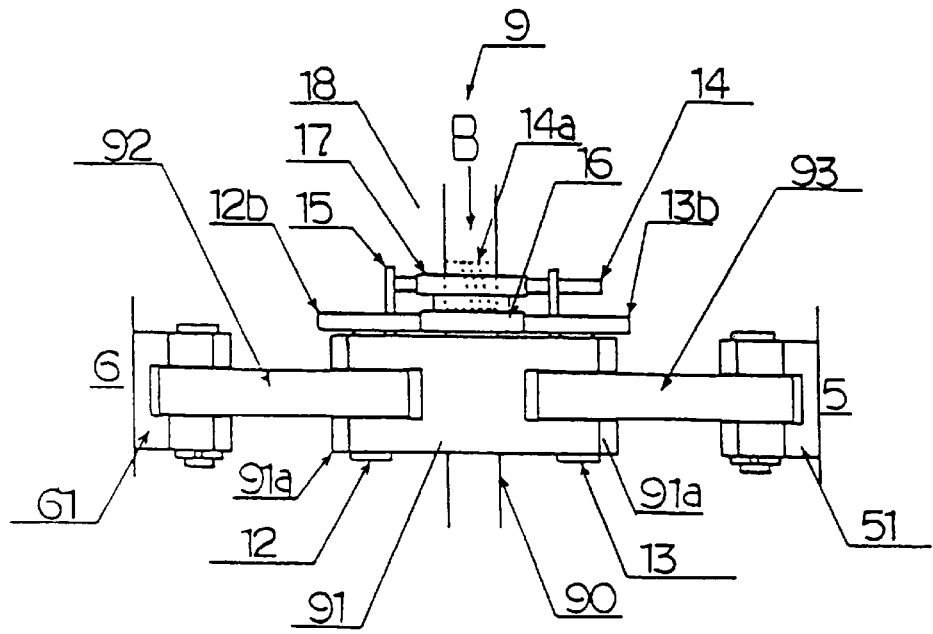
FIG. 5 is a view showing a mechanism for adjusting the expanding and contracting length of a crank mechanism in the mold-clamping device of the above embodiment.

As shown in FIGS. 3 and 4, an endless timing belt 31 is strained over each pulley 30 fixed to the bushes 40 of the front platen 4. A forwardly horizontally projecting shaft 32 is turnably provided generally on the center of the front surface portion of the front platen 4. A driving pulley 33 and a worm wheel 34 are fixed to this shaft 32. On a front surface portion of the front platen 4, a hand shaft 35 is horizontally and turnably supported by a support member such that the hand shaft 35 is located below the worm wheel 34. A worm 36 meshed with the worm wheel 34 is fixed to an axially intermediate portion of the hand shaft 35. A counter 37 is attached to one end portion of the hand shaft 35. By doing so, a fixed position of the front platen 4 can be indicated by an amount of movement by this counter 37. Here, the pulley 30, the timing belt 31, the shaft 32, the driving pulley 33, the worm wheel 34, the hand shaft 35, the worm gear 36, and the counter 37 constitute a fixed position adjusting mechanism 11 capable of fixing the front platen 4 to the tie bar 3 at a desired position of a front end portion of the tie bar 3.

The crank mechanism 9 chiefly comprises the crank shaft 90, the crank arm 91 fixed to a generally central portion of the crank shaft 90 in an axial direction thereof, and rods 92, 93 fixed to the crank arm 91. Opposite end portions of the crank shaft 90 are turnably supported by pillow blocks 21 fixed to the device body 2. A driving shaft (not shown) of the electric motor 10 is connected to one end portion of the crank shaft 90 through a reduction unit 10a. Owing to this arrangement, the crank mechanism 9 is actuated by driving the electric motor 10. The crank arm 91 includes arm portions 91a which are arranged in rotational symmetry at 180 degrees with respect to the crank shaft 90. The connecting rods 92, 93 are connected to distal end portions of the arm portions 91a through connecting pins 12, 13, as later described, respectively. When the arm portions 91a and the connecting rods 92, 93 are aligned, the split molds 7, 8 are brought into contact with each other to generate a prescribed clamping force.

Figure 6A:
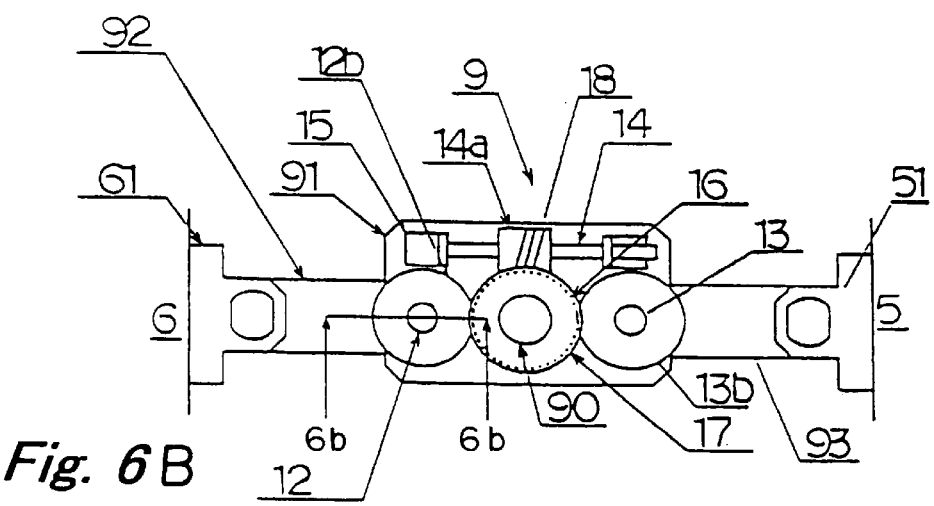
FIG. 6(a) is a side view thereof when viewed in a direction as indicated by an arrow B of FIG. 5.
Figure 6B:
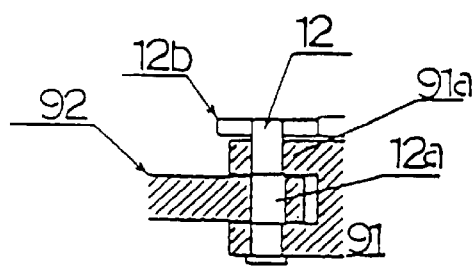
FIG. 6(b) is a sectional view taken on line C—C and viewed in a direction as indicated by arrows of FIG. 6(a)

As shown in FIG. 6, the connecting pins 12, 13 for connecting the crank arm 91 and the connecting rods 92, 93 together are provided at axially intermediate portions thereof with eccentric portions 12a, 13a (only the connecting pin 12 shown in FIG. 6(b)) each having a larger outside diameter than that of the opposite end portions and displaced in axis from that of each opposite end portion. The connecting pins 12, 13 are provided respectively with gears 12b, 13b fixed respectively to distal end portions of the connecting pins 12, 13.

The opposite end portions of the connecting pins 12, 13 are turnably supported by the arm portions 91a of the crank arm 91, and the eccentric portions 12a 13a are inserted into insertion cavities (not shown) of the connecting rods 92, 93. A hand shaft 14 is horizontally and rotatably supported by a support member 15 at a portion of a side surface portion of the crank arm 91 under (above in FIG. 6(a)) the gears 12b, 13b. A worm gear 14a is fixed to an axially intermediate portion of the hand shaft 14. On the other hand, a gear 16 meshed with the gears 12b, 13b and a worm wheel 17 fixed to the gear 16 and meshed with the worm 14a are arranged on the crank shaft 90 for rotation relative to the crank shaft 90. The hand shaft 14 is rotated to cause the connecting pins 12, 13 to rotate through the worm 14a, the worm wheel 17, the gear 16, and the gears 12b, 13b. This varies the distance from the axis of the crank shaft 90 to the axis of the eccentric portions 12a, 13a, so that the expanding length of the crank mechanism 9 is adjusted. By doing so, the crank arm 91 and the connecting rods 92, 93 can be expanded linearly irrespective of the dimension and configuration of the mold. Here, the eccentric portions 12a, 13a, the gears 12b, 13b, 16, the hand shaft 14, the worm 14a, and the worm wheel 17 constitute a mechanism 18 for adjusting the expanding length of the crank mechanism 9.

Figure 7:
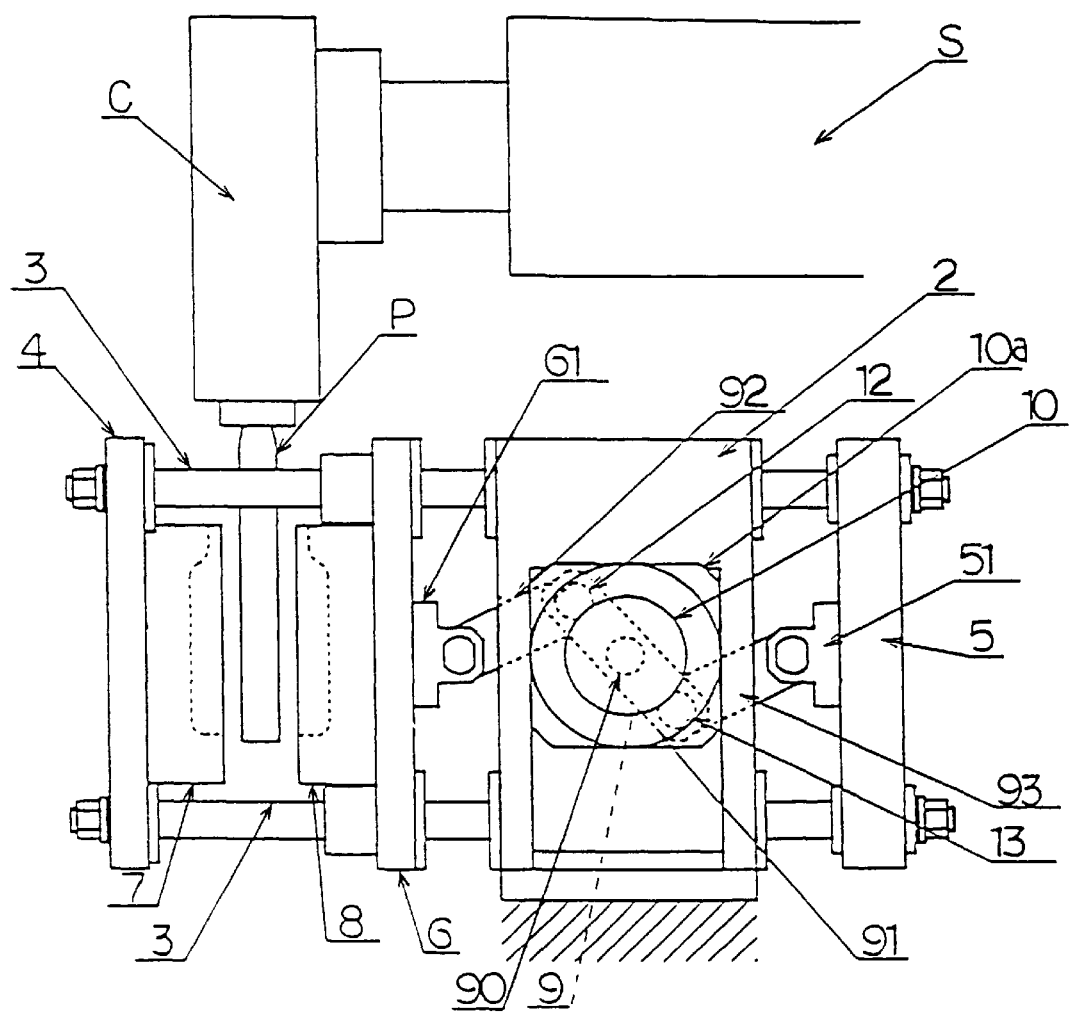
FIG. 7 is a side view showing the mold-clamping device of the above embodiment is located at the underneath of an extruding machine.
Figure 8:
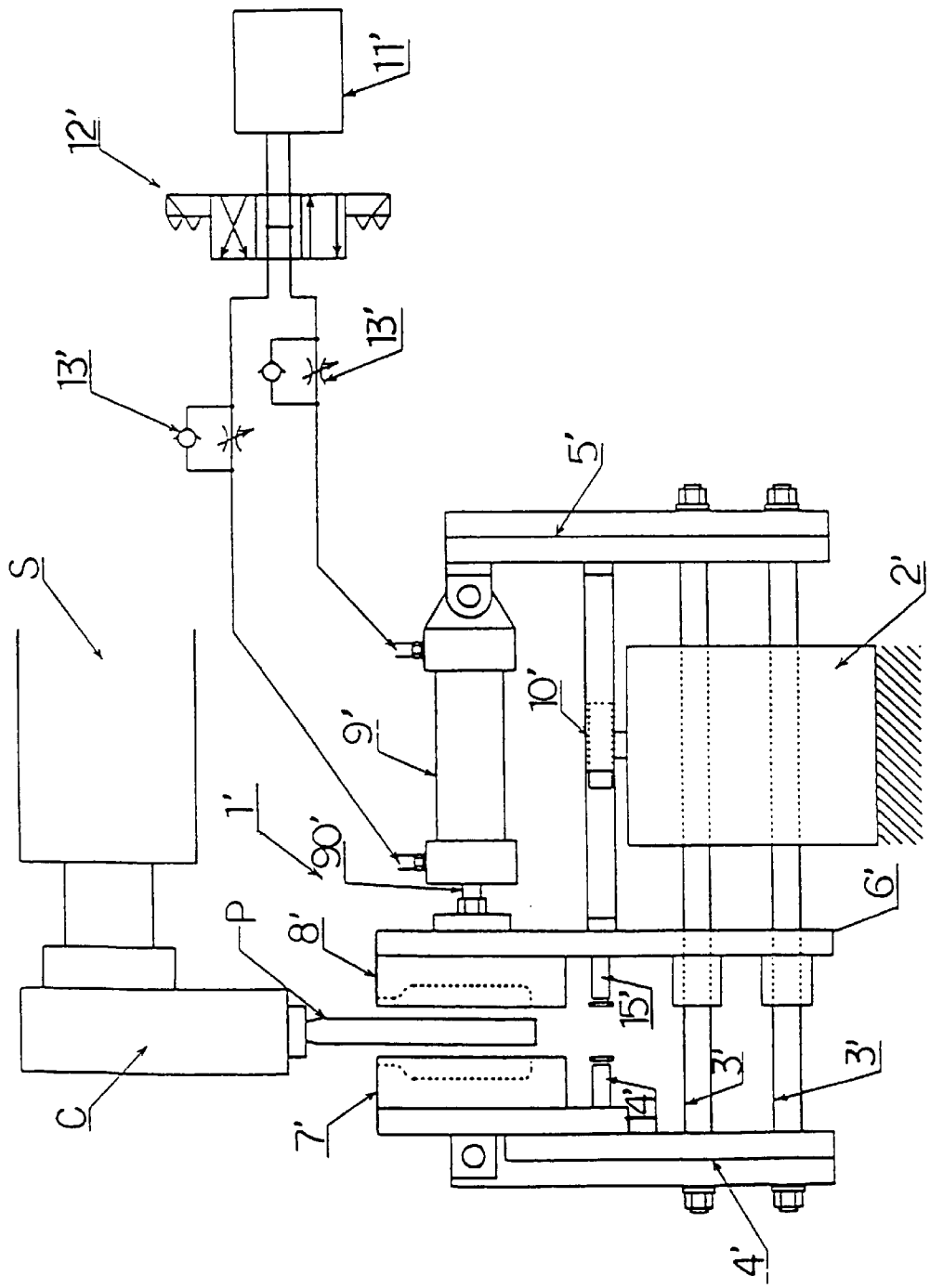
FIG. 8 is a side view showing a conventional mold-clamping device of a blow molding machine.

Next, the operation of the mold-clamping device 1 will be described with reference to FIGS. 3 through 6, and 7. In FIG. 7, reference symbol P denotes a parison; S, an extruding device; and C, a cross head of the extruding device S, respectively.

As shown in FIG. 7, first, the mold-clamping device 1 is set in a prescribed position, so that the parison P supplied downwardly from the cross head C of the extruding machine S can be held between the split mold halves 7, 8. Then, the fixed position of the front platen 4 at the front end portion of the tie bar 3 is adjusted by the fixed position adjusting mechanism 11 (see FIGS. 3 and 4), or the positions of the front platen 4, the movable platen 6, and the rear platen 5 are adjusted by the expanding-and-contracting length adjusting mechanism 18 (see FIGS. 5 and 6), so that a required clamping force is generated at the position where the crank arm 91 and the connecting rods 12, 13 are aligned in accordance with the conditions such as the size and configuration of the split mold halves 7, 8, the blowing pressure, etc. Thereafter, the crank mechanism 9 is established such that connecting rods 92, 93 are bent with respect to the arm portion 91a of the crank arm 91. The parison P is hung within the cavity of the split mold halves 7, 8.

When the parison P is extruded a prescribed length, the electric motor 10 is driven, and the driving force of the electric motor 10 is transmitted to the crank shaft 90 after it is reduced in speed by the reduction unit 10a. Then, the crank arm 91 fixed to the crank shaft 90 is also rotated in response to rotation of the crank shaft 90. As a consequence, the connecting rods 92, 93 connected to the arm portion 91a of the crank arm 91 through the connecting pins 12, 13 are stretched outwardly from the center of the crank shaft 90. In response to the stretching of the connecting rods 92, 93, the connecting rods 92, 93 cause the rear platen 5 and the movable platen 6 move away each other through the support jigs 51, 61.

Then, the movable platen 6 approaches the parison P along the tie bars 3, 3. Also, the front platen 4 approaches the parison P by the backward movement of the tie bars 3, 3 themselves in response to the backward movement of the rear platen 5. Lastly, the abutment surfaces of the split mold halves 7, 8 come into abutment, and the parison P is held between the split mold halves 7, 8. After the finish of a prescribed blow molding operation, the split mold halves 7, 8 are caused to escape forwardly and backwardly, thereby completing the molding operation.

As described above, according to the mold clamping device 1, since the crank mechanisms 9 is employed for opening and closing the split molds 7, 8, it is not necessary to normally apply a hydraulic oil which is necessary in a hydraulic operating piston cylinder mechanism. Accordingly, the running cost can be reduced compared with the conventional technique, and the various problems arising from the use of hydraulic devices can be obviated.

Moreover, since the torque load required for clamping is low, a small-sized motor of a low torque such as the electric motor can be employed.

Further, since a uniform clamping force can be applied to the abutment surfaces of the split molds 7, 8 by arranging the tie bars 3, 3 diagonally to the center of each of the split molds, an excellent hollow molded product having less burr can be manufactured. Since the front platens 4 and the movable platens 6 where the split molds 7, 8 are arranged can be reduced in weight and size, the devices themselves can be designed smaller and lighter. Thus, the requirements for energy saving and space saving can be fulfilled.

Moreover, since the split molds 7, 8 can be clamped in the state that the crank arm 91 and the connecting rods 92, 93 are stretched linearly by the fixed position adjusting mechanism 11 of the front platen 4 and the expanding and contacting length adjusting mechanism 18 of the crank mechanism 9, a molding operation can be performed by a uniform clamping force in a stable manner irrespective of the size and configuration of the mold.

It should be noted that the mold clamping device 1 of a blow molding machine according to the present invention is not limited to the mold clamping device 1 of the above embodiment but that it can be changed, where necessary, in size and configuration without departing from the objects of the present invention.

Further, in the mold clamping device 1 of a blow molding machine of the above embodiment, both the fixed position adjusting mechanism 11 and the expanding and contracting length adjusting mechanism 18 are employed. In the alternative, either of the mechanisms may only be employed, or, in case no change is made with respect to the mold, the fixed position adjusting mechanism and the expanding and contracting length adjusting mechanism are not necessarily employed.

Although, in the mold clamping device of a blow molding machine according to the present invention, it is particularly preferred to employ the electric motor 10 of the above embodiment as a power source, the crank mechanism may be driven by a power source which is driven by fuel such as kerosene, gasoline, heavy oil, and the like.

According to the mold-clamping device of a blow molding machine of the present invention, the following effects can be exhibited.

According to the mold-clamping device of a blow molding machine, the movable platen and the rear platen can be driven by the crank mechanism. Accordingly, the driving source does not require the torque when the clamping force is generated, unlike the conventional devices. Therefore, the running cost can be reduced compared with the conventional devices, and the various problems associated with the use of the conventional hydraulic devices are no more occurred.

According to the mold-clamping device in a blow molding machine, there is a provision of a fixed position adjusting mechanism capable of fixing the front platen to the tie bar at a desired position of the front end portion of the tie bar. Accordingly, the position of the front platen can be adjusted in match with the size and the configuration of the split mold halves. Owing to this arrangement, a uniform clamping force can be generated normally and in a stable manner in the state where the crank arm of the crank mechanism and the connecting rods are linearly stretched.

According to the mold-clamping device of a blow molding machine, there is a provision of the mechanism for adjusting the expanding and contracting length of the crank mechanism. Accordingly, the expanding and contracting length of the crank mechanism can also be adjusted in match with the size and the configuration of the split mold halves. Owing to this arrangement, a uniform clamping force can be generated normally and in a stable manner in the state where the crank arm of the crank mechanism and the connecting rods are linearly stretched.

According to the mold-clamping device of a blow molding machine, the front platen and the movable platen are arranged on the tie bar such that they are located in symmetrical relation with respect to the center of the split mold halves. Accordingly, the clamping force can be applied to the abutment surfaces of the split mold halves. Therefore, the front platen and the movable platen, on which the split mold halves are arranged, can be reduced in size and weight.

What is claimed is:

1. In a mold-clamping device of a blow molding machine comprising a body portion, tie bars for movement forwardly and backwardly supported in a horizontal posture thereof by said body portion, a front and a rear platen disposed respectively on a front and a rear end portion of said tie bars, a movable platen forwadly and backwardly movably disposed on said tie bars in such a manner as to face with said front platen, and split mold halves disposed on the mutually opposing sides of said front platen and said movable platen, said mold-clamping device in a blow molding machine being characterized in that said body portion is provided with a crank mechanism and a driving source, said driving source is for transmitting a driving force to said crank mechanism and a crank shaft of said crank mechanism, and said rear platen and said movable platen are connected to a crank arm of said crank mechanism respectively through connecting rods, said mold-clamping device further comprising a mechanism capable of adjusting an expanding and contracting length of said crank mechanism.

2. The mold-clamping device of a blow molding machine according to claim 1, further comprising a fixed position adjusting mechanism capable of fixing said front platen to said tie bars at a desired position of a front end portion of said tie bars.

3. The mold-clamping device of a blow molding machine according to claim 2, wherein said front platen and said movable platen are arranged on said tie bars such that they are in symmetrical relation with respect to the center of said split mold halves.

4. The mold-clamping device of a blow molding machine according to claim 1, wherein said front platen and said movable platen are arranged on said tie bars such that they are in symmetrical relation with respect to the center of said split mold halves.

* * * * *